United States Patent [19]

Powell

[11] 4,387,394
[45] Jun. 7, 1983

[54] SENSING FOCUS OF A COLOR KINESCOPE

[75] Inventor: Jerry P. Powell, Morristown, Ind.

[73] Assignee: RCA Corporation, New York, N.Y.

[21] Appl. No.: 221,831

[22] Filed: Dec. 31, 1980

[51] Int. Cl.³ .......................... H04N 9/62; H04N 7/02
[52] U.S. Cl. .................................... 358/139; 315/10;
 315/382; 358/10; 358/218
[58] Field of Search ................. 358/139, 242, 218, 10,
 358/64; 315/10, 382

[56] References Cited

U.S. PATENT DOCUMENTS

| | | | |
|---|---|---|---|
| 2,556,455 | 6/1951 | Szegho | 358/218 |
| 2,571,306 | 10/1951 | Szegho | 358/218 |
| 2,978,646 | 4/1961 | Shumard | 455/226 |
| 3,356,792 | 12/1967 | Peters | 358/218 |
| 3,647,952 | 3/1972 | Ball | 358/218 |
| 3,699,251 | 10/1972 | McKechnie | 358/227 |
| 3,710,018 | 1/1973 | Ryley | 358/139 |
| 3,728,482 | 4/1973 | Wren | 358/227 |
| 3,875,585 | 4/1975 | Burrus | 358/44 |
| 3,949,166 | 4/1976 | Fuse | 358/242 |
| 4,317,135 | 2/1982 | Pitruzzello | 358/227 |

FOREIGN PATENT DOCUMENTS

| | | | |
|---|---|---|---|
| 52-50117 | 4/1977 | Japan | 358/227 |
| 52-55425 | 5/1977 | Japan | 358/139 |
| 52-55426 | 5/1977 | Japan | 358/139 |
| 52-58416 | 5/1977 | Japan | 358/227 |

Primary Examiner—Howard Britton
Attorney, Agent, or Firm—Eugene M. Whitacre; Paul J. Rasmussen; Scott J. Stevens

[57] ABSTRACT

An apparatus for sensing electron beam focus on the display screen of a kinescope comprises a photodiode adapted to detect the light output from an area on the kinescope display screen. A signal having a frequency equal to the scanned excitation rate of the individual screen phosphor element areas being excited by a deflected electron beam is developed from the photodiode output. The variation in the amplitude of this signal is an indication of electron beam focus condition.

15 Claims, 3 Drawing Figures

SENSING FOCUS OF A COLOR KINESCOPE

This invention relates to television receiver adjustments, and in particular, to a method and apparatus for sensing optimum electron beam focus in a color television kinescope.

A television receiver operates by scanning an electron beam horizontally and vertically across a phosphor display screen to produce a raster. The beam is intensity modulated with a video signal to produce an image on the display screen. In color television receivers, three electron beams are produced and the display screen comprises a pattern of color-producing phosphor elements, usually red, blue and green. A color selection electrode, such as an aperture mask is located between the electron beam source and the display screen to control the landing positions of the electron beams so that each electron beam desirably strikes only one of a particular color-producing phosphor type. In currently manufactured color kinescopes, the aperture mask is most usually comprised of small rectangular slots registered with the three color-producing phosphor types arranged in vertical stripes on the display screen.

One important determinant of kinescope performance is the quality of focus or sharpness of the electron beams when they strike the display screen, which is directly related to the spot size of the beams. Focus of the beams is controlled by the application of a voltage to a focus electrode in the electrode gun assembly of the kinescope. Focus voltage is generally determined by the electron optics associated with the electron gun assembly, but factors such as beam interaction with deflection yoke fields can degrade focus and require focus adjustment. It is important to maintain optimum beam focus, and hence minimum spot size, in order to provide maximum image sharpness and clarity of the displayed picture. With television receivers, focus is usually adjusted during final assembly of the kinescope or receiver. This single setting is usually sufficient to provide acceptable focus over the life of the receiver. It is obviously critical that this single focus adjustment be done correctly. This may be accomplished by an operator adjusting a focus electrode potentiometer while viewing a spot or dot pattern on the kinescope display screen. This method, however, may be time consuming, and it does rely on the judgement of the operator.

In color receivers having self-converging deflection yokes, spot distortion, due to deflection defocussing caused by the deflection fields of the deflection yoke, occurs as the beams are deflected away from the center of the screen. It is desirable, therefor, to optimize focus at some point away from the center of the screen in order to minimize the effect of this deflection defocussing. This may present difficulties to the operator in attempting to optimize focus of a misshapen spot.

The present invention provides a means for quickly and accurately adjusting beam focus to optimize beam spot size without relying on operator judgement.

In accordance with the present invention, an apparatus is provided for sensing electron beam focus for use in a kinescope having an electron gun assembly producing an electron beam which impinges on a display screen to excite a plurality of phosphor elements. Means are provided for detecting an output from the excitation of the phosphor elements as the electron beam is deflected across the screen. Means are provided for deriving a signal component the variation of which is indicative of electron beam focus condition.

In the accompanying drawing,

FIG. 1a illustrates an alternate embodiment of a portion of the circuit shown in FIG. 1.

Figure 1:
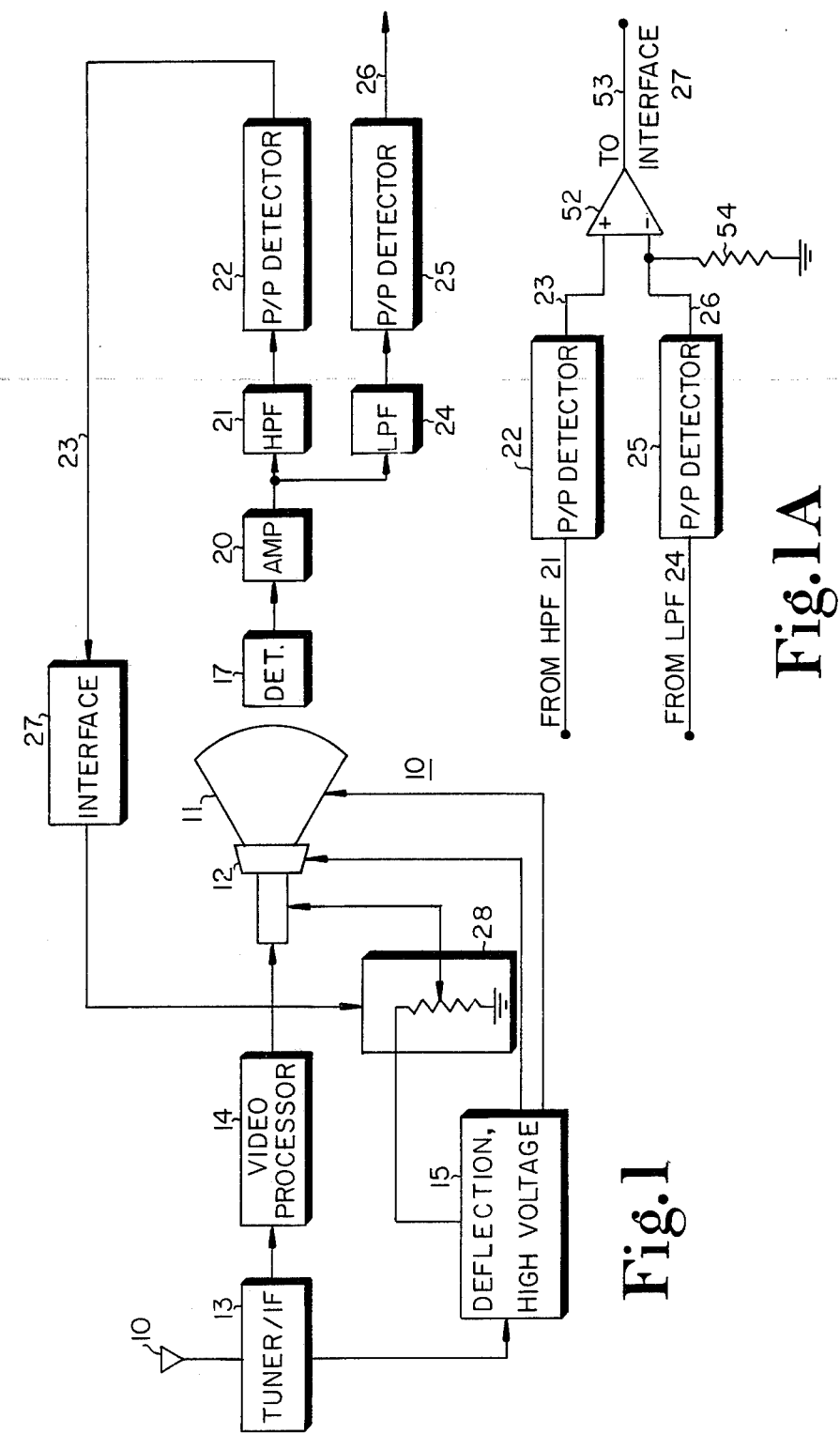
FIG. 1 illustrates a block diagram of a focus sensing arrangement in accordance with the present invention.
Figure 2:
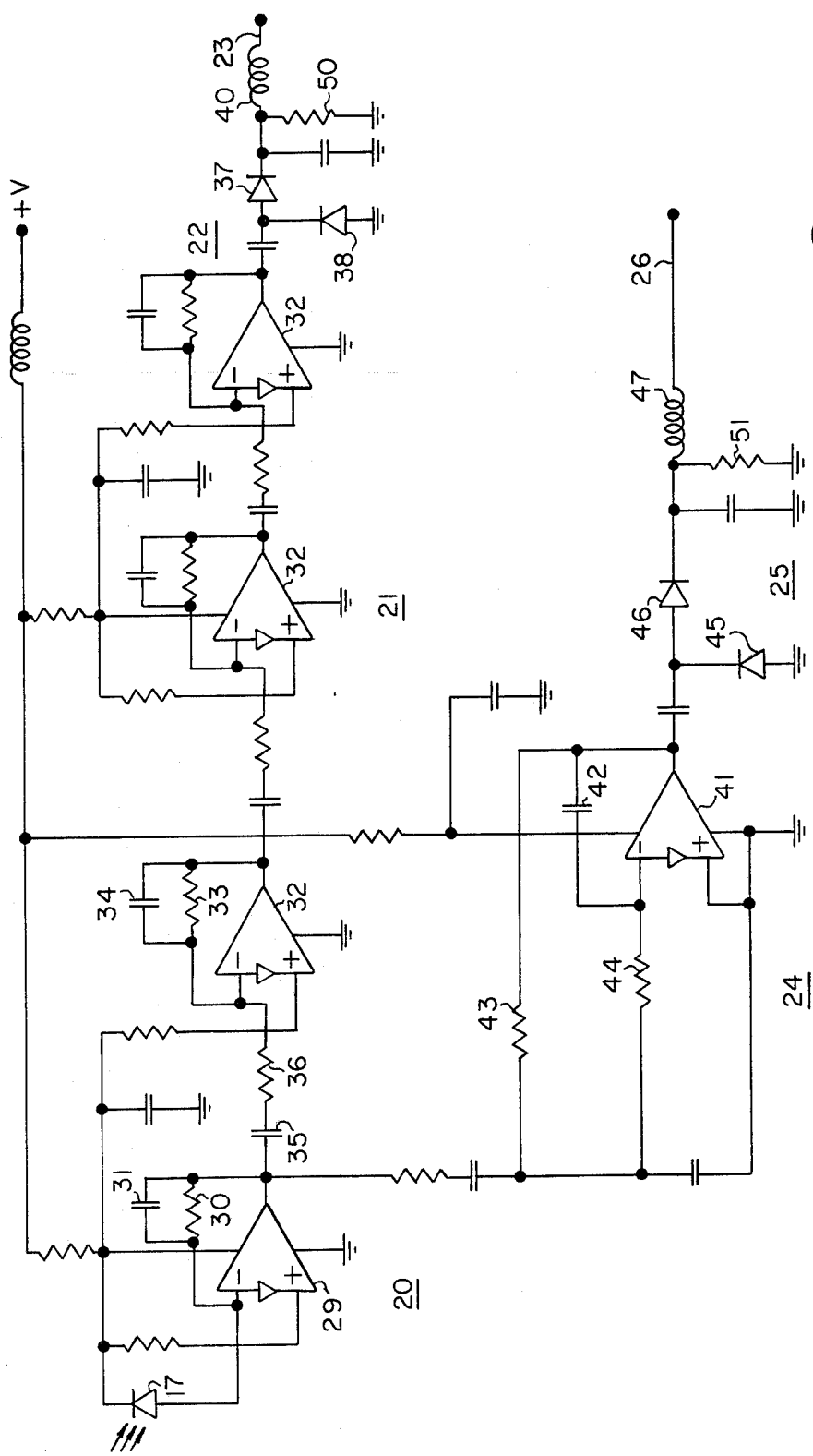
FIG. 2 illustrates a schematic diagram of a focus sensing apparatus in accordance with the invention.

Referring to FIGS. 1 and 2, an apparatus will be described which derives the scan excitation rate signal from the light output of a scanned display screen area, and processes that component to develop a signal indicative of beam focus quality.

In FIG. 1, a television receiver comprises an antenna 10, which receives radio frequency signals and applies them to tuning and intermediate frequency circuits. An output of tuner and IF circuit 13 is applied to a video processor 14 which supplies drive signals to the electron gun assembly of a kinescope 11. Synchronizing signals derived from the output of tuner 13 are applied to deflection and high voltage circuits 15, which in turn produce scanning currents for the horizontal and vertical deflection coils of a deflection yoke 12. Deflection and high voltage circuits 15 also provides the ultor voltage to the anode of kinescope 11 and focus voltage to a focus potentiometer 28 which controls the voltage applied to the focus electrode of the electron gun assembly of kinescope 11.

A detector 17, which may be a photodiode, is located adjacent to the kinescope display screen in order to receive light emitted from a plurality of phosphor areas within the field of view of the detector.

The aperture or shadow mask, as previously described, controls the landing positions of the three electron beams on the phosphor display screen. A large percentage of the electrons produced by the electron gun assembly will be blocked by the shadow mask, with a controlled number of electrons passing through the mask apertures to strike and excite the phosphors of the display screen. The display screen is, therefore, excited in a pattern of minute areas, corresponding to the electrons that passed through a particular mask aperture. Since the mask is relatively close to the display screen, the electrons which pass through a mask aperture do not diverge appreciably before striking the screen. The size of each excited area, therefore, is approximately the size of a single aperture. However, the size of the electron beam spot which strikes the shadow mask will typically encompass four or more mask apertures even with a highly focussed beam, and will, therefore, excite four or more areas on the display screen. The total excited area, is, however, quite small. A poorly focussed beam may excite many more phosphor areas than a highly focussed beam, which results in a lack of sharpness and less apparent brightness of the displayed images. A poorly focussed beam also exhibits a much less clearly defined outline or contour with respect to a focussed beam.

As the electron beams are scanned across the display screen, in a horizontal direction, for example, electrons pass through successive mask apertures and excite successive phosphor areas on the display screen. This scan excitation rate is determined by the scanning velocity of the beam and the distance between excited phosphor areas according to the formula $f = v/d$ where $f$ = scan excitation rate (number of phosphor elements scanned- /unit time); v=scanning velocity of beam; d=distance between successively excited phosphor areas.

For explanatory purposes, it may be assumed that a given phosphor area is fully excited when the center of the electron beam spot coincides with the center of the phosphor area. Practically, due to unsymmetrical beam shape, it is difficult to determine the center of the spot. Therefore, it is more convenient to consider that a phosphor spot is excited when its light output reaches a maximum for a given electron beam spot. Although the scan excitation rate will be independent of beam focus, a highly focussed beam will excite successive phosphor areas to maximum brightness (turn-on) more quickly, than a poorly focussed beam, since the electrons of the focussed beam are more concentrated than those of a poorly focussed beam. The beam spot of a poorly focussed beam is spread over a larger area and the leading edge of the beam spot is less well-defined than that of a focused beam.

The light output from a region of the display screen will include a signal component at the scan excitation rate. The amplitude of this signal component for a given light output will be in part determined by the degree of focus condition or sharpness of the scanning electron beam spot. As previously described, a highly focussed beam spot results in rapid turn-on of successively excited phosphor area. This rapid turn-on causes the light output from that display screen region to increase sharply in well-defined steps at the scan excitation rate frequency. A poorly focussed beam spot produces slower turn-on of successively excited phosphor area. Therefore, the light output increases at the scan excitation rate frequency will occur in lower amplitude and less well-defined steps than that caused by a focussed beam. The scan excitation rate frequency signal component will, therefore, be of lower amplitude with a poorly focussed beam spot than with a high focussed beam spot, for a given light output. Therefore, an increase in the amplitude of scan excitation rate frequency signal component tends to indicate an increase in the condition of beam focus. Photodiode detector 17, which is illuminated by the excited phosphor areas within its field of view, will produce an output having the scan excitation rate signal component.

The detector output is amplified by amplifier 20 and then processed by a high pass filter 21, which has a cutoff frequency below the scan excitation rate frequency. For an RCA 19VKGP22 picture tube, the scan excitations rate frequency will be approximately 10 MHz. For a larger screen size, this frequency will be higher, since the mask aperture spacing is substantially equal for all screen sizes, yet the beam scanning velocity is increased. Correspondingly, the scan excitation rate frequency will be lower for smaller screen sizes. The signal components of the output signal of high pass filter 21 at the higher frequency harmonics of the fundamental scan excitation rate frequency will also increase in amplitude as beam spot sharpness increases. These harmonic signal components may also contribute to the overall signal output from high pass filter 21.

The output signal of high pass filter 21 including the 10 MHz scan excitation rate component from high pass filter 21 is applied to a peak-to-peak detector 22 which, for example, may provide an output indicative of the scan excitation rate component amplitude. This output is applied to an interface 27 via line 23 which utilizes this signal as an input to a focus adjustment means, such as a focus potentiometer 28. Focus potentiometer 28 is electrically connected to the focus electrode of the kinescope electron gun assembly. The operation, of interface 27 will be described in more detail later.

The amplitude of the scan excitation rate signal component, in addition to being determined by the quantity of electron beam focus or sharpness, is also affected by the overall brightness level of the excited screen area. The output from amplifier 20 is, therefore, processed by a low-pass filter 24 and a peak-to-peak detector 25 to derive a signal indicative of the level of screen brightness. This brightness level signal, represented by line 26, may be applied to the receiver circuitry to preset the brightness control to a standard brightness level, which may be reproduced on a set-by-set basis during focus testing and adjustment. If desired, the brightness level signal may be combined with the scan excitation rate signal, for example, as shown in FIG. 1a, in order to subtract the brightness signal contribution from the overall scan excitation rate signal amplitude.

In FIG. 1a, the outputs of detectors 22 and 25 are applied to a difference amplifier 52, which produces an output 53 comprising a signal having the scan excitation rate signal component with the brightness signal component removed. Resistor 54 sets the level of the brightness component that is to be subtracted. Output 53 is then applied to interface 27, which operates as previously described.

In FIG. 1, interface 27 represents a number of alternate embodiments. In one application, interface 27 may be a voltmeter. An operator would then manually adjust the focus potentiometer 28 while viewing the meter until a predetermined meter reading (e.g., a maximum or peak) is reached. In another embodiment, interface 27 is a servo-driven adjustment tool, which interacts directly with the focus potentiometer 28. The servo motor is controlled by the signal on line 23 such that potentiometer 28 is automatically adjusted to optimize beam focus. In still another embodiment, interface 27 may represent a microprocessor-controlled system, which could automatically adjust many receiver circuits in addition to focus.

FIG. 2 illustrates a schematic diagram of the focus sensing apparatus in accordance with the present invention, which has previously been described with reference to FIG. 1. Detector 17 comprises a photodiode, commercially available under the component designation C30810. In a particular embodiment, the active area or field of view of the photodiode encompasses approximately 12 horizontal scan lines with 15-20 aperture slits per line. A relatively large number of slits per line is necessarily viewed by detector 17 to develop a sufficiently large scan excitation rate signal in order to achieve accurate repeatable results. In operation, a green or blue flat field raster is normally displayed, since green and blue respond quicker than the red phosphor elements, and will, therefore, provide a high amplitude signal.

Amplifier 20 is connected as a current amplifier with the input essentially at ground potential in order to avoid any voltage swing between the input. Such a voltage difference would be amplified and would greatly exceed the low level scan excitation rate signal. A feedback path comprising resistor 30 and capacitor 31 prevents amplifier 20 from oscillating.

High pass filter 21 comprises three filter stages which provide a lower frequency limit rolloff at approximately 7 MHz. Since all video signal information is presently below 5 MHz., a 7 MHz. filter rolloff will prevent interference from any superimposed, undesirable video signal, yet allow focus measurement on any size kinescope without modifying the filter circuitry. Each filter stage comprises, for example, an operational amplifier 32, feedback resistor 33 and capacitor 34 connected in parallel, and a series connected input capacitor 35 and resistor 36.

The output of the three filter stages of high pass filter 21 is applied to peak-to-peak detector 22 which comprises diodes 37 and 38. Inductor 40 acts as an rf filter to prevent the focus sensing apparatus from interfering with the operation of the kinescope or receiver. Resistor 50 presents the load across peak-to-peak detector 22 that controls the decay rate of the output from detector 22.

The output from peak-to-peak detector 22 on line 23 may be applied to a sample and hold circuit (not shown) which stores the maximum output from detector 22 and provides a dc voltage indicative of the maximum detector output. Such a voltage may be useful, such as in operating a meter, in order to easily adjust the beam focus to an optimum condition. As an alternative to the sample and hold circuit, a high impedance load at the output of detector 22, such as resistor 50, will maintain signal level between refreshing.

Low-pass filter 24, having an upper cutoff limit of approximately 25 KHz., comprises an operational amplifier 41, feedback capacitor 42 and resistor 43, in parallel, and input resistor 44. The configuration of the components of low-pass filter 24 is known to one skilled in the art. The output from low-pass filter 24 is applied to peak-to-peak detector 25, comprising diodes 45 and 46, and rf choke 47 to output line 26. A resistor 51 coupled across peak-to-peak detector 25 represents the load on detector 25 which controls the decay rate of detector 25. A sample and hold circuit (not shown) may also be coupled to output line 26 in order to provide a dc voltage indicative of brightness information. The brightness information on line 26 is useful to set the kinescope electron gun assembly to a predetermined drive level. It may also be used as a measure against a defined brightness range to disable the focus sensing circuitry when the brightness falls outside the desired range. The latter procedure may be used with a system which estimates on the tube or receiver production line whether or not a tube may be able to meet minimum focus requirements. When the focus information is used only to control a meter in order to adjust focus for a maximum meter reading, the brightness information is not needed.

Although the focus sensing apparatus of the present invention has been described in relationship to a kinescope having a slotted aperture mask, the principle of the invention also is applicable to a kinescope having a dot mask structure.

What is claimed is:

1. Apparatus for sensing electron beam focus for use with a kinescope having an electron gun assembly for producing an electron beam, said beam impinging on a display screen to excite a plurality of phosphor elements, said sensing apparatus comprising:
   means for deflecting said beam across said screen to provide the excitation of said phosphor elements in a predetermined order;
   means for detecting an output from said phosphor elements representative of the rate at which said beam excites said phosphor elements; and
   means responsive to said detected output for deriving a signal component the variation of which is indicative of electron beam focus condition.

2. The arrangement defined in claim 1, wherein said detecting means comprises a photodiode.

3. The arrangement defined in claim 1, wherein said deriving means comprises a high pass filter.

4. The arrangement defined in claim 3, wherein said high pass filter exhibits a cut off frequency of approximately 7 MHz.

5. The arrangement defined in claim 1, wherein said signal component exhibits an increase in amplitude as said electron beam focus condition improves.

6. The arrangement defined in claim 1, wherein said phosphor elements exhibit a particular rate of excitation when said beam is deflected across said screen.

7. The arrangement defined in claim 6, wherein said phosphor element excitation rate is substantially independent of said electron beam focus condition.

8. The arrangement defined in claim 6, wherein said signal component exhibits a frequency substantially equal to said phosphor element rate of excitation.

9. Apparatus for sensing electron beam focus for use with a kinescope having an electron gun assembly for producing an electron beam, said beam impinging on a display screen to excite a plurality of phosphor elements, and incorporating means, coupled to said kinescope, for adjusting the focus of said electron beam, said sensing apparatus comprising:
   means for deflecting said beam across said screen to provide the excitation of said phosphor elements in a predetermined order;
   means for detecting an output from said phosphor elements representative of the rate at which said beam excites said phosphor elements;
   means responsive to said detected output for deriving a signal component the variation of which is indicative of electron beam focus condition; and
   means responsive to said signal component, for controlling said focus adjusting means.

10. The arrangement defined in claim 9, wherein said focus adjusting means comprises a potentiometer.

11. The arrangement defined in claim 9, wherein said controlling means comprises a servomotor.

12. The arrangement defined in claim 1, wherein said derived signal component includes a signal component the amplitude of which is indicative of the brightness of said excited phosphor elements, and wherein said deriving means incorporates means for removing said brightness indicative signal component from said derived signal component.

13. The arrangement defined in claim 1, wherein said deriving means incorporates a low pass filter for removing said brightness indicative signal component.

14. A method for sensing electron beam focus for use with a kinescope having an electron gun assembly for producing an electron beam, said beam impinging on a display screen to excite a plurality of phosphor elements, comprising the steps of:
   scanning said beam across said screen to excite said phosphor elements in a predetermined order at a predetermined rate;
   detecting an output from said phosphor elements in response to said phosphor element excitation related to said predetermined rate; and
   developing a signal component responsive to said detected output, indicative of the degree of sharpness of the electron beam focus.

15. A method for adjusting focus of an electron beam for use with a kinescope having an electron gun assembly for producing an electron beam, said beam impinging on a display screen to excite a plurality of phosphor elements, and incorporating means, coupled to said kinescope, for adjusting the focus of said electron beam, comprising the steps of:

scanning said beam across said screen to excite said phosphor elements in a predetermined order;

detecting an output from said phosphor elements representative of the rate at which said beam excites said phosphor elements;

developing a signal component responsive to said detected output the variations of which are indicative of electron beam focus condition; and varying said focus adjusting means until said signal component variations indicate the occurrence of the desired electron beam focus condition.

* * * * *